April 16, 1968  C. C. SIMONS ET AL  3,377,694
EXPLOSION WELDING OF INCOMPATIBLE METALS
Filed Oct. 12, 1965
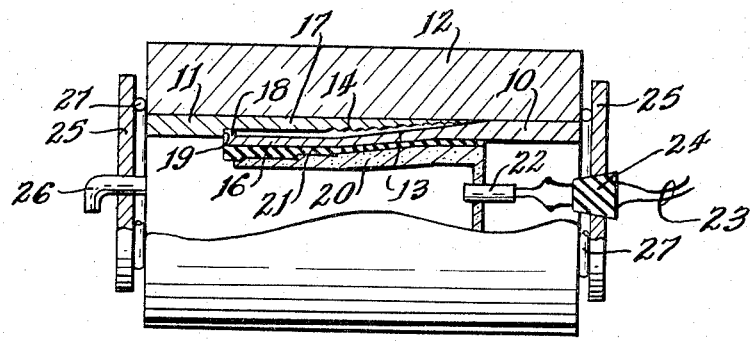
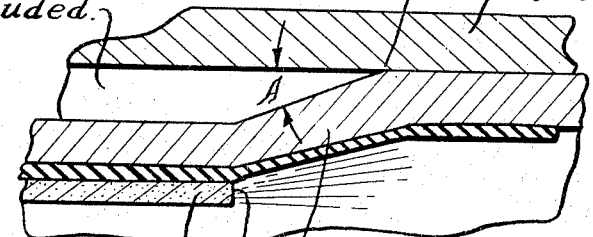
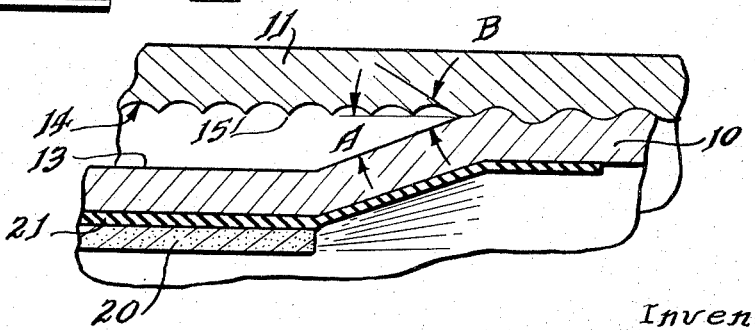
Inventors
Charles C. Simons
Ronald L. Bradford
By: *[signature]*
Attorney 3,377,694
EXPLOSION WELDING OF INCOM-
PATIBLE METALS
Charles C. Simons, Kennewick, Wash., and Ronald L.
Bradford, Columbus, Ohio, assignors to the United
States of America as represented by the United States
Atomic Energy Commission
Filed Oct. 12, 1965, Ser. No. 495,359
9 Claims. (Cl. 29—470.1)

ABSTRACT OF THE DISCLOSURE

Method of explosion welding of incompatible metals by forming a scalloped surface on the face of one metal to be joined, thereby permitting extrusion of diffusion products formed during the welding.

---

This invention relates to explosion welding. More particularly, it relates to the welding of metals that are incompatible in the sense that the alloy or alloys formed on bonding of these metals by known methods of welding are unstable or brittle and thus unsatisfactory as joints between these metals.

Certain zirconium-rich alloys that are known as Zircaloy are used extensively in pressurized-water reactors because of their favorable thermal-neutron-absorption cross section and high resistance to corrosion. The high cost of Zircaloy makes it essential that it be used sparingly and only in the critical areas adjacent to the nuclear fuel. From the cost standpoint it is desirable to supplement the Zircaloy in the less critical areas by the use of Inconel or stainless steel, both of which possess resistance to pressurized-water corrosion. It is extremely important that the welded joints between the Zircaloy and Inconel or stainless steel be leak tight, strong, and moderately ductile. When Zircaloy is fusion-welded or diffusion-bonded to Inconel or stainless steel, brittle diffusion products are formed that make weak welds or bonds.

Accordingly, it becomes desirable to join Zircaloy to Inconel or stainless steel by a "cold" joining technique such as roll bonding, friction welding, coextrusion, or explosion welding. Of these, explosion welding is the most attractive because of the size and shape of the parts to be joined in pressurized-water reactors. Yet known methods of explosion welding have proved unsatisfactory, because it has been difficult, if not impossible, to eliminate or keep out from the bonds brittle diffusion products formed by the heating of the parts being bonded due to the action of the explosive.

It is an object of the present invention to explosion-weld parts composed of different materials without forming diffusion products of the materials. Such explosion welding is applicable to incompatible materials such as Zircaloy and Inconel or stainless steel, the diffusion products of which are brittle.

A further object is to explosion-weld parts of different materials without forming diffusion products, without special regard to the detonation velocity of the explosives used. The diffusion products present in a bond made by explosion welding may be due in part to the relatively high detonation velocity of the explosive. It is possible to reduce such diffusion products by a special explosive, not readily available, of low detonation velocity. The present method of explosion welding eliminates diffusion products even with use of explosives of high detonation velocity.

According to the present invention, one of overlapping surfaces of parts to be bonded by explosion welding is provided with scallops. Thus, as the explosive is fired progressively along the surfaces and the surfaces are forcibly brought progressively into contact with one another, the scallops cause a sufficient angle to be repeatedly established between the surfaces, with the result that the diffusion products formed by the alloying of the heated portions of the parts subjected to the explosion are expelled from between the surfaces and a true cold weld free of brittle inclusions is formed between the parts.

Other objects will be apparent from the description that follows when taken in conjunction with the drawings, in which:

FIG. 1 is a longitudinal sectional view showing the explosion welding of tubes according to the present invention;

FIG. 2 is a schematic view illustrating explosion welding being carried out without the scalloped surface of the present invention; and FIG. 3 is a similar view of explosion welding being carried out with the benefits of the scalloped surface.

As shown in FIG. 1, tubes 10 and 11 overlap one another and are located in a cylindrical die 12, which fits them. Tube 10, which extends into tube 11, has a slightly conical, exterior surface portion 13, which is surrounded by, and slightly spaced from, an internal surface portion 14 of the tube 11, which portion is overall slightly conical to about the same degree as the external surface portion 13, but is scalloped so as to have pointed ridges 15 which extend radially inward toward the axis of tube 11 and arcuate valleys between the ridges. The ridges 15 may be formed as one or more internal helical threads or individually as complete rings.

Beyond the conical surface portions 13 and 14, the tubes 10 and 11, respectively, are provided with an external cylindrical surface portion 16 and an internal cylindrical surface portion 17, which faces portion 16 and is slightly spaced therefrom. The tube 10 has at its end just beyond the surface portion 16 an external lip 18, which engages the surface portion 16 and an internal shoulder 19 on the tube 11 just beyond the surface portion 17.

Within tube 10 is a sleeve-like feathered charge 20 of explosive, which is coextensive with the overlapping regions of the tubes 10 and 11. The charge 20 is contained in a neoprene-rubber sleeve 21, which engages the interior of the tube 10. The firing of the charge 20 is initiated by an electric blasting cap 22 set off by an electric current supplied through wires 23. The wires are brought out through a rubber plug 24 lodged in one of two end discs 25. The other end disc is penetrated by a vacuum line 26, by which the spaces within the tubes 10 and 11 and between the surface portions 13, 14, 16, and 17 are evacuated. The end discs 25 are pressed by means (not shown) against O-ring seals 27 which engage the ends of the die 12 so that the aforementioned spaces are sealed.

When the blasting cap 22 is set off, the charge 20 is fired, the firing proceeding progressively from the end where the blasting cap is located to the opposite end. The effect of the firing is to bring about a progressive movement of the tube 10 outward against the tube 11 at the surfaces 13 and 14. The outward movement of the tube 10 against the tube 11 progresses longitudinally of the tubes and lags behind the progressive firing of the charge 20.

FIG. 2 shows the results of this action in the tubes being welded when the scalloped surface conformation provided by the ridges 15 is not present. As a result of the firing of the explosive and the movement of the surfaces of the parts to be welded against one another, the surface films become molten and are extruded from between the parts by progressive movement of the one part toward the other. The width of the space through which the molten portions can be squeezed is determined by the angle A, which is a function of the extent to which the point of firing is ahead of the point at which the metal parts have moved together, or to some extent, the detonation velocity of the explosive charge. With readily available explosives, the detonation velocity is relatively high, and the firing progresses faster than the movement of the metal parts against one another. Thus the angle A soon decreases to the point where the molten film portions cannot be extruded out and become trapped so as to interfere with the effectiveness of the bond.

It would be possible to keep the angle A relatively large by a relatively large spacing between the parts being welded. A small spacing, however, has proved necessary, for structural damage of the parts is caused by the energy input required to bring widely spaced parts together for welding.

It must also be understood that there is some minimum detonation velocity of explosive required, because the speed at which the point of contact established between the parts being brought together is necessarily less than the detonation velocity and must always be above some minimum assuring that the surface layers become sufficiently mobile as a result of adiabatic compression as to be extruded out from between the parts.

Reference is now made to FIG. 3. Here the tube 10 is being moved progressively outwardly against the tube 11 by the progressive detonation of the charge 20 with the result that contact is established progressively between the outer surface portion 13 and the ridges 15 of the internal surface portion 14. The angle of the surface 14 as a whole with the surface 13 as contact is established is A, a value comparable to that of FIG. 2. Yet periodically as illustrated by the angle B, the angle between the tubes 10 and 11 is appreciably greater, so that in spite of high detonation velocity of the charge 20, the molten surface films are extruded out, rather than trapped, and true cold weld, without diffusion and accompanying brittleness, is achieved. This larger angle B is obtained when the bringing together of the surfaces 13 and 14 has reached a ridge 15 or has gone beyond the ridge for an appreciable distance. As the bringing together of the surfaces 13 and 14 approaches a ridge 15, the angle between the surfaces becomes less than angle A, but this narrowing of the space does not trap molten surface films, because the narrowing continues for only a short period so that the molten portions are blown by.

As the firing of the charge 20 continues after the surface portions 13 and 14 have been brought into contact, the surface portion 16 of tube 10 is moved over to surface 17 of tube 11, but this is done so that the explosion welding does not terminate at a very thin or pointed region of the tube 10 as would be the case if the tubes 10 and 11 were not shaped so as to include the surface portions 16 and 17 and external lip 18. After the welding operation is completed, the interiors of the joined tubes 10 and 11 are machined from one end to the other for removal of the portions at which the surface portions 16 and 17 and lip 18 are located.

We have successfully explosion-welded tubes 10 and 11 on a number of occasions when tube 10 was of Inconel-600 and had an outer diameter of 3.50" and an inner diameter of 3.27"; the tube 11 was of Zircaloy-II and had an outer diameter of 3.50" and an inner diameter of 3.26"; the surfaces 13 and 14 were 2.35" in length and at an angle of 3°17′52″ to the axis of tubes 10 and 11; the spacing between the surface 13 and the ridges 15 of surface 14 was .04", the spacing between the peaks of the ridges 15 was .1356"; the surface regions between ridges 15 had a radius of .125" and at their mid points were .020" closer to the axis of the tube 11 than the peaks of the ridges; the charge 20 had a detonation velocity of 23,500'/sec., was formed of pentaerythritoltetranitrate, and had a unit strength of 12 g./in.² of surface area for the first 1 1/16" measured from the end where the blasting cap 22 is located, a unit strength of 10 g. for the next 1/4", a unit strength of 8 g. for the next 1/4", a unit strength of 6 g. for the next 1/4", a unit strength of 4 g. for the next 1 1/8", and a unit strength of 2 g. for the final 1/4", the die 12 was of mild steel; and the surfaces 16 and 17 of tubes 10 and 11 were 3.23" and 3.269" in outside diameter, and .835" in length. After being machined, the tubes 10 and 11 were prepared for welding by being treated with methyl ethyl ketone for the removal of grease and by being subjected at their mating surfaces to a rotating wire brush.

We have had best results when the ridges 15 are shaped about as described and shown; that is, they come to a point or nearly so and are connected by curved or arcuate valleys.

It is understood that the invention is not to be limited by the details given herein but that it may be modified within the scope of the appended claims.

The embodiments of the invention in which an exclusive property or privilege is claimed as defined as follows:

1. A method of explosion welding incompatible metal parts, comprising juxtaposing the parts so that facing surfaces thereof to be welded to one another are in general parallel, slightly spaced relationship, one of the surfaces being scalloped, applying an explosive charge along a surface of one part on the side thereof away from the surface to be welded the detonation velocity of said explosive charge being sufficient to form a metallurgical bond between the two metal parts, and detonating the charge progressively so as to move the said one part progressively against the said other part for joining the parts in a cold weld.

2. A method of explosion welding incompatible metal tubes in an overlapping joint, comprising juxtaposing the tubes so that an internal surface of one tube surrounds an external surface of the other tube in facing and slightly and generally equally spaced relationship, one of said tubes being formed of Inconel-600 and the other of Zircaloy-II, said external and internal surfaces of the tubes being slightly conical, forming on the internal surface of one tube to be welded ridges extending peripherally of the tube, said ridges coming generally to a point and being separated by arcuate valleys, the spacing between said ridges being .1356" and said arcuate valleys having a radius of .125", applying an explosive having a detonation velocity of 23,500'/sec. to the interior of the tube having the external surface to be welded, and detonating the charge progressively lengthwise of the tube so as to move the one said tube against the other tube for joining the tubes in a cold weld.

3. The method specified in claim 1, the scalloped surface being formed of spaced ridges extending transversely to the direction in which the charge is detonated progressively.

4. The method specified in claim 3, the ridges being generally pointed and connected to one another by arcuate valleys, one of the parts being welded being formed of Zircaloy-II, the other part being formed of Inconel-600.

5. A method of explosion-welding incompatible metal tubes in an overlapping joint, comprising juxtaposing the tubes so that an internal surface of one tube surrounds an external surface of the other tube in facing and slightly and generally equally spaced relationship, one of said surfaces being provided with ridges extending peripherally of the tubes, applying an explosive charge along a peripheral surface of one tube away from the surface thereof to be welded, and detonating the charge progressively lengthwise of the tubes so as to move the said one tube against the other tube for joining the tubes in a cold weld.

6. The method specified in claim 5, the said external and internal surface of the tubes to be welded being slightly conical.

7. The method specified in claim 6, the explosive being applied to the interior of the tube having the external surface to be welded, the ridges being formed on said internal surface of the other tube to be welded.

8. The method specified in claim 7, one of the tubes being formed of Inconel-600, and the other of Zircaloy-II, the ridges coming generally to a point and being separated by arcuate valleys.

9. The method specified in claim 8, the tube being formed of Zircaloy-II being the tube having the ridges on the surface to be welded.

References Cited

UNITED STATES PATENTS

| | | | |
|---|---|---|---|
| 3,137,937 | 6/1964 | Cowan et al. | 29—497.5 X |
| 3,205,574 | 9/1965 | Prennecke | 29—497.5 X |
| 3,258,839 | 7/1966 | Resnick | 29—497.5 X |

OTHER REFERENCES

Explosive Welding, Compaction, Joining and Preparation, by Zernow, Lieberman & Kincheloe, Creative Man'f. Sem., 1961, A.S.T.M.E. (Paper #SP #60-141), pp. 6 and 12.

CHARLIE T. MOON, *Primary Examiner.*

P. M. COHEN, *Assistant Examiner.*